United States Patent
Boys et al.

(10) Patent No.: US 7,279,850 B2
(45) Date of Patent: Oct. 9, 2007

(54) DECOUPLING CIRCUITS

(75) Inventors: John Talbot Boys, Auckland (NZ); Grant Anthony Covic, Auckland (NZ)

(73) Assignee: Auckland Uniservices Ltd., Auckland (NZ)

(*) Notice: Subject to any disclaimer, the term of this patent is extended or adjusted under 35 U.S.C. 154(b) by 0 days.

(21) Appl. No.: 11/246,166

(22) Filed: Oct. 11, 2005

(65) Prior Publication Data

US 2006/0082324 A1    Apr. 20, 2006

Related U.S. Application Data

(63) Continuation of application No. PCT/NZ2004/000066, filed on Apr. 5, 2004.

(30) Foreign Application Priority Data

Apr. 9, 2003    (NZ) ..................................... 532156

(51) Int. Cl.
*H05B 37/02* (2006.01)
*H05B 37/00* (2006.01)

(52) U.S. Cl. .................. 315/244; 315/224; 315/209 R

(58) Field of Classification Search ............... 315/224, 315/225, 209 R, 247
See application file for complete search history.

(56) References Cited

U.S. PATENT DOCUMENTS

| | | | | |
|---|---|---|---|---|
| 4,914,539 | A * | 4/1990 | Turner et al. | 361/18 |
| 5,293,308 | A * | 3/1994 | Boys et al. | 363/37 |
| 5,726,504 | A * | 3/1998 | Pecukonis et al. | 307/105 |
| 5,998,930 | A * | 12/1999 | Upadhyay et al. | 315/106 |
| 5,998,993 | A * | 12/1999 | Inage et al. | 324/210 |
| 6,686,823 | B2 * | 2/2004 | Arntz et al. | 336/174 |
| 6,705,441 | B1 * | 3/2004 | Boys et al. | 191/10 |
| 7,042,161 | B1 * | 5/2006 | Konopka | 315/119 |
| 2002/0175638 | A1 * | 11/2002 | Nerone et al. | 315/291 |
| 2003/0222594 | A1 * | 12/2003 | Mita | 315/224 |
| 2006/0108940 | A1 * | 5/2006 | Kamoi | 315/209 R |

* cited by examiner

*Primary Examiner*—Trinh Vo Dinh
(74) *Attorney, Agent, or Firm*—Young & Thompson

(57) ABSTRACT

Power taken inductively from the alternating current in a track is received by a resonant circuit which is output controlled by a switching circuit asynchronous with the frequency of the power supply. The switch on and off time is controlled to regulate the output power and the circuit is such that on light loads the resonant circuit decouples from the track.

6 Claims, 2 Drawing Sheets

DECOUPLING CIRCUITS

TECHNICAL FIELD

This invention relates to the transfer of power by inductive power transfer from current carrying conductors, and controlling the amount of power transferred into the load by allowing the receiver to at least partially decouple itself from the current carrying conductors when the load is small.

BACKGROUND

Inductive power transfer relies on alternating power inductively coupled from conductors and received in a power receiver by inductive transfer from those conductors. The receipt of power may be augmented by field concentrating devices and/or by tuning the power receiver to the power frequency.

This specification relates to systems in which the receiver contains a circuit which is resonant at or near the frequency of the current in the conductors. Known circuits for inductive power transfer may produce substantial reactive power flow when the tuned circuit is detuned to reduce power flow.

1. The Problem

The problem of unwanted reactive power flow can be almost completely overcome using what are known as "decoupling" controllers, however the choice available to designers is very restrictive. These controllers act by disconnecting the tuned circuit from the load, that is by decoupling the load from the inductive power receiving circuit. The decoupling may occur at a slower rate than the power frequency, or it may occur at a faster rate than the power frequency. In either case the average power taken from the power source is reduced. The relationship between the time coupled and the time decoupled may vary, so that the controller effectively acts to partially variably decouple the load.

If a parallel circuit topology is used for the inductive power receiver, then the maximum load current is fixed and increases in power for short transient situations can only be achieved by increasing the output voltage. Since most equipment is voltage sensitive this is unacceptable. Conversely if the power receiving circuit is a series tuned circuit it has a fixed maximum output voltage but does allow increases in power by transient surge currents. Here the average output voltage may be set by the switch duty cycle but the current may then be allowed to increase transiently as required. However these transient surges correspond to high voltages across the pick-up coil and the tuning capacitor and these may be unacceptable.

2. Prior Art

Resonant inductive power transfer is known, see for instance:

U.S. Pat. No. 4,914,539 by Turner et al. describes an inductive power transfer system for supplying power to airline seats. The specification describes a resonant power receiver which is synchronously regulated by shorting across the resonant circuit for a portion of the positive-going cycles. The construction of this circuit is such that shorting across the resonant circuit for substantially less than quarter of a cycle per cycle varies the circuit reactance. The change in circuit reactance shifts the circuit resonance and hence reduces the available power out. However substantial reactive power flow still exists between the track conductors and the receiver and hence it should be noted that this is not decoupling of the output.

Publication WO 01/71882 describes a resonant circuit in which a synchronous switch shorts across a parallel resonant circuit for portions of leading half cycles of the power waveform. This circuit could induce dangerous conditions if the switch or the load failed in an open condition.

U.S. Pat. No. 5,293,308 describes a resonant circuit in which power flow from the track conductors to the receiver can be essentially completely decoupled. Here an asynchronous switch either shorts across a parallel resonant circuit or opens at least a portion of a series resonant circuit at any switching frequency required. In either case the power transferred to the resonant circuit can be reduced to near zero. Variation of the duty cycle of the switch can provide any required output power up to the maximum available. In the minimum power condition there is essentially no adverse reactive power flow.

OBJECT

It is an object of the invention to provide a method of at least providing a switchably controllable resonant receiver for inductive power transfer such that the power transferred may be controlled to accommodate a wide range of coupling conditions, where the limitations on either the maximum voltage or the maximum current are reduced. It is a further object of the invention to know the failure modes of the control circuit so that protection means may be incorporated so that the circuit will fail safely with a switch failure or with a receiver load failure. Finally it is a further object of the invention to at least provide the public with a useful choice.

STATEMENT OF INVENTION

A switchable circuit for receiving power inductively from an alternating current power supply, which includes a receiving circuit which is substantially resonant at the frequency of the received power, wherein the receiving circuit is a series resonant circuit, the output of the receiving circuit is rectified, the rectified output is supplied to a boost connected switched mode power circuit which supplies the power output, and the switch of the power supply is controlled to maintain the output voltage constant as the load varies and on loads where the rectifier current substantially reduces to zero the circuit will substantially decouple itself from the said alternating current power supply.

Preferably the switchable circuit utilises a full wave rectifier and a unidirectional switching component.

Preferably the switch is a parallel disposed switch.

Preferably the switch is continually switched at a frequency higher than the power supply frequency and unrelated to the power supply frequency with a variable on/off time to regulate the output voltage or current.

Preferably the switch is continually switched at a frequency lower than the power supply frequency with a variable on/off time to regulate the output voltage and current.

Preferably the failure mode due to the failure of a single component is identifiable and the circuit will not self destruct in the event of such a failure.

Preferably the maximum circuit current is limited by a saturable reactor forming part of the receiving circuit.

DESCRIPTION OF DRAWINGS

These and other aspects of this invention, which would be considered as novel in all aspects will become apparent from the following description, which is given by way of example. With reference to the accompanying partial drawings a potential receiver circuit comprises either FIG. 1 or FIG. 2 as the resonant part of the complete receiver, and any one of FIGS. 3, 4, 5 or 6 as the control part. In this way eight potential receivers are possible and are listed in table 1. The figures are.

DETAILED DESCRIPTION OF THE PREFERRED EMBODIMENTS

From FIGS. 1 to 6 eight potential receivers may be constructed by pairs of figures as described below. The first figure relates to the resonant input of the receiver and the second figure relates to the type of controller.

Figure 1:
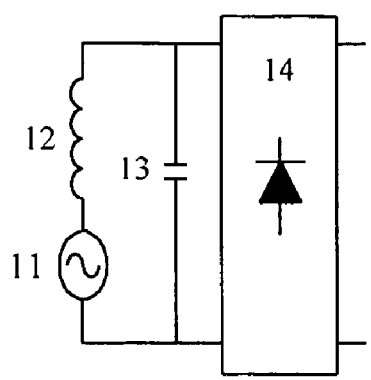
FIG. 1 shows a parallel resonant receiver without control

FIG. 1+3 represents a circuit for a known prior art receiver decoupling

Figure 2:
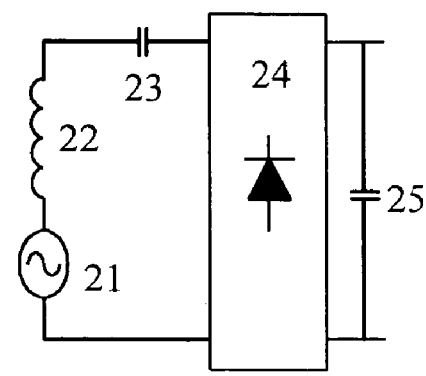
FIG. 2 shows a series resonant receiver without control

FIG. 1+4 represents a circuit for a theoretical receiver which cannot decouple and has no practical application to the present time FIG. 1+5 represents a new circuit according to another application FIG. 1+6 represents another new circuit according to another application FIG. 2+3 represents a circuit which cannot be decoupled by a controller but surprisingly has practical applications and is the object of the present invention FIG. 2+4 represents a circuit for a known receiver decoupling switch FIG. 2+5 represents a new circuit according to another application FIG. 2+6 represents a new circuit according to another application FIG. 1 shows a parallel resonant receiver having an inductor 12 and capacitor 13 receiving power from source 11. The output of source 11 is rectified at 14.

FIG. 2 shows a series resonant receiver having an inductor 22 and a capacitor 23 with a rectifier 24. The rectifier 24 is shunted by capacitor 25.

Figure 3:
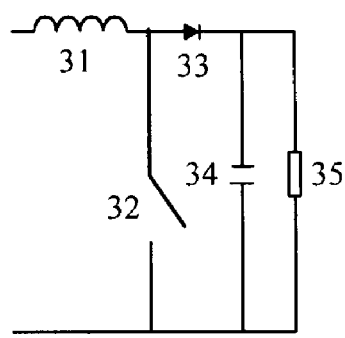
FIG. 3 shows a control circuit in boost configuration
Figure 7:
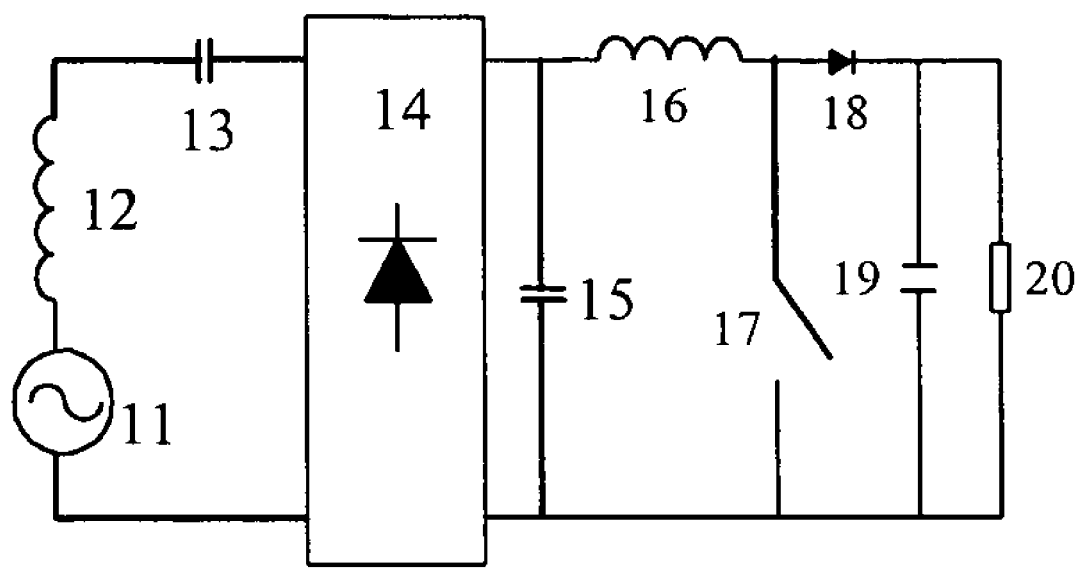
FIG. 7 shows the combination of FIGS. 2+3 and is the object of the present invention.

When FIG. 3 is connected to the output of FIG. 2, as shown in FIG. 7, the DC output of the series tuned resonant circuit across smoothing capacitor 25 is connected via boost inductor 31 to a load circuit of resistor 35 and smoothing capacitor 34 via rectifier 33.

Providing asynchronous switch 33 is switched at a high frequency typically above the power supply frequency it will act to control power flow to the load, such that when switch 33 is cycled on, no power is transferred to the load and when it is cycled off power transfers to the load. However with switch 33 completely off, as in a failure mode, and the load at very low levels, the output voltage from this circuit will eventually charge smoothing capacitor 25 to the maximum voltage the series resonant circuit can sustain, and at this point the circuit presents an open circuit to the pickup and the action of the circuit is to decouple the pick-up coil from the trackway such that no power is transferred from the trackway to the pick-up circuit. This decoupling action is not a function of the switch but of the reduced loading on the pickup. If the switch is 'off' and the load is reduced to zero, then the circuit will decouple itself but both of these conditions must be met for decoupling to occur. Thus this circuit thus cannot actually decouple the resonant circuit from the power in the track loop but nonetheless acts to control the power in normal circumstances.

The circuit constants may be such and the switching speed may be low enough that this behaviour is promoted in normal circumstances, for instance by using a smaller smoothing capacitor at 25.

Figure 4:
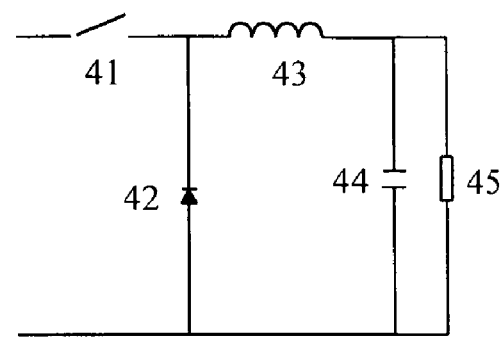
FIG. 4 shows a control circuit in buck configuration

When FIG. 4 is connected to the output of FIG. 2 a known receiver circuit is produced whose output from full wave rectifier 24 and smoothing DC capacitor 25 is applied to a load circuit generally of capacitor 44 and resistor 45 via buck inductor 43 and rectifier 42. Asynchronous switch 41 acts to alter the transfer of power. If switch 41 is open no power is transferred to the load arid vice versa. Rectifier 42 enables continuous current flow in buck inductor 43 when switch 41 is open. Furthermore, when switch 41 is open this essentially completely decouples the receiver from the power supply. In such a condition the circuit will receive very little power from the supply.

Figure 5:
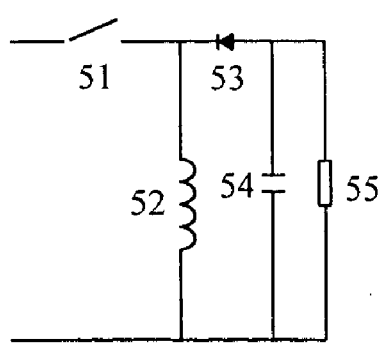
FIG. 5 shows a control circuit in buck-boost configuration

When FIG. 5 is connected to the output of FIG. 2 a series resonant receiver with a buck-boost control circuit is produced. Switch 51 feeds the load circuit comprising capacitor 54 and resistor 55 via buck boost inductor 52 and rectifier 53. Opening the switch prevents power flow to the resonant circuit and provides decoupling, while also preventing power flow on the secondary side to the load.

Figure 6:
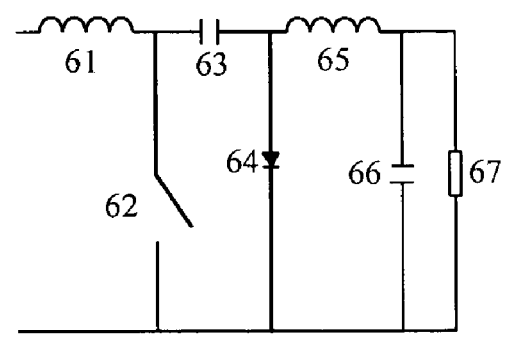
FIG. 6 shows a control circuit in so called Cuk configuration

When FIG. 6 is connected to the output of FIG. 2 a series resonant receiver with a Cuk control circuit is produced. A secondary inductor 61 acts to supply a load circuit comprising inductor 65, capacitor 66 and resistor 67 via asynchronous switch 62, Cuk capacitor 63 and rectifier 64. Operation of the switch is effective in providing decoupling.

FIG. 7 shows a combination of FIGS. 2 and 3 with an A/C supply 11, a series inductor 12, a series capacitor 13, and a rectifier 14. Power from source 11 is passed to capacitor 15, inductor 16 and switch 17 from which the output, passes via diode 18 and capacitor 19 to load resistor 20.

TABLE 1

| Figure | Tuning | Controlled Decoupling Ability | Theoretical Output Current ($I_o$) | Theoretical Output Voltage ($V_o$) | Observed Q | Theoretical Output Power |
|---|---|---|---|---|---|---|
| 1 + 3 | Parallel | Yes | $\frac{\pi}{2\sqrt{2}} \frac{IM}{L}(1-D)$ | $\frac{2\sqrt{2}}{\pi} \omega MIQ \frac{1}{(1-D)}$ | $\frac{\pi}{2\sqrt{2}} \frac{V_o}{\omega MI}(1-D)$ | $\omega I^2 \frac{M^2}{L} Q$ |
| 1 + 4 | Parallel | No | $\frac{\pi}{2\sqrt{2}} \frac{IM}{L} \frac{1}{D}$ | $\frac{2\sqrt{2}}{\pi} \omega MIQ$ | $\frac{\pi}{2\sqrt{2}} \frac{V_o}{\omega MI} \frac{1}{D}$ | $\omega I^2 \frac{M^2}{L} Q$ |

TABLE 1-continued

| Figure | Tuning | Controlled Decoupling Ability | Theoretical Output Current ($I_o$) | Theoretical Output Voltage ($V_o$) | Observed Q | Theoretical Output Power |
|---|---|---|---|---|---|---|
| 1 + 5 | Parallel | Yes | $\dfrac{\pi}{2\sqrt{2}} \dfrac{IM}{L} \dfrac{(1-D)}{D}$ | $\dfrac{2\sqrt{2}}{\pi} \omega MIQ \dfrac{D}{(1-D)}$ | $\dfrac{\pi}{2\sqrt{2}} \dfrac{V_o}{\omega MI} \dfrac{(1-D)}{D}$ | $\omega I^2 \dfrac{M^2}{L} Q$ |
| 1 + 6 | Parallel | Yes | $\dfrac{\pi}{2\sqrt{2}} \dfrac{IM}{L} \dfrac{D}{(1-D)}$ | $\dfrac{2\sqrt{2}}{\pi} \omega MIQ \dfrac{(1-D)}{D}$ | $\dfrac{\pi}{2\sqrt{2}} \dfrac{V_o}{\omega MI} \dfrac{D}{(1-D)}$ | $\omega I^2 \dfrac{M^2}{L} Q$ |
| 2 + 3 | Series | No | $\dfrac{2\sqrt{2}}{\pi} \dfrac{IM}{L} Q(1-D)$ | $\dfrac{\pi}{2\sqrt{2}} \omega MI \dfrac{1}{(1-D)}$ | $\dfrac{\pi}{2\sqrt{2}} \dfrac{LI_o}{MI} \dfrac{1}{(1-D)}$ | $\omega I^2 \dfrac{M^2}{L} Q$ |
| 2 + 4 | Series | Yes | $\dfrac{2\sqrt{2}}{\pi} \dfrac{IM}{L} Q \dfrac{1}{D}$ | $\dfrac{\pi}{2\sqrt{2}} \omega MID$ | $\dfrac{\pi}{2\sqrt{2}} \dfrac{LI_o}{MI} D$ | $\omega I^2 \dfrac{M^2}{L} Q$ |
| 2 + 5 | Series | Yes | $\dfrac{2\sqrt{2}}{\pi} \dfrac{IM}{L} Q \dfrac{(1-D)}{D}$ | $\dfrac{\pi}{2\sqrt{2}} \omega MI \dfrac{D}{(1-D)}$ | $\dfrac{\pi}{2\sqrt{2}} \dfrac{LI_o}{MI} \dfrac{D}{(1-D)}$ | $\omega I^2 \dfrac{M^2}{L} Q$ |
| 2 + 6 | Series | Yes | $\dfrac{2\sqrt{2}}{\pi} \dfrac{IM}{L} Q \dfrac{(1-D)}{D}$ | $\dfrac{\pi}{2\sqrt{2}} \omega MI \dfrac{D}{(1-D)}$ | $\dfrac{\pi}{2\sqrt{2}} \dfrac{LI_o}{MI} \dfrac{D}{(1-D)}$ | $\omega I^2 \dfrac{M^2}{L} Q$ |

The performance of all of these circuits can be compared in terms of their theoretical output voltage and theoretical output current, and a complete set of results is given in table 1. Here I is the track current, M is the mutual inductance between the track and the receiver coil, L is the inductance of the receiver coil, D is the fractional time that the switch in each circuit (namely 32, 41, 51, 62) is on for, ω is the track frequency, Vo is the output voltage and Io is the output current. The only control variable is D, while the theoretical maximum output power varies with the design Q of the circuit (the receiver coil quality factor). Here we introduce a new observation, the observed Q (which is defined as what an observer would actually see while the circuit was operating) which is a measure of the average resonance occurring in the resonant circuit under the particular operating conditions, and is listed in table 1. If the observed Q can be reduced to essentially zero by varying D, then the circuit can be essentially completely decoupled. Thus all circuits except those created using FIGS. 1+4 and FIG. 2+3 can be essentially completely decoupled by operating the switch. FIG. 2+3 is the object of the present invention and cannot be decoupled but surprisingly is a useful circuit.

Advantages of the Invention

An ideal method of control for all IPT circuits is decoupling where, regardless of the status of the load over the range from short circuit to open circuit, the switch can always be operated to decouple the receiver circuit such that no power is transferred from the current carrying conductors to the receiver coil. The present invention of 2+3 cannot be decoupled but it is nonetheless usable. Decoupling finds its greatest advantage with lightly loaded circuits where the circuit Q can otherwise become very large causing problems of power flow to other pick-up systems on the same trackway. While 2+3 cannot be decoupled in these lightly loaded conditions it will decouple itself. Thus here the circuit is operated such that the output voltage is maintained constant and if the load goes essentially to zero the circuit will decouple without the action of the switch. FIG. 2 produces a DC voltage across its output capacitor 25 and FIG. 3 acts as a boost converter to produce the correct load voltage across load resistor 35. The circuit has a disadvantage relative to 1+3 in that it is not intrinsically safe on a short circuit but it is safe on an open circuit and short circuit protection is not difficult to arrange either electronically with additional circuitry or magnetically using a saturable reactor across tuning capacitor 23, or by using a fuse. In Clean Rooms a fuse is acceptable as it provides protection with zero emissions.

The circuit has a further advantage applicable also to the other series tuned pickups in the figures, in that if a series tuned pickup is physically removed from the track loop the track constants are not affected. Most pickups operate with parallel tuned circuits which always present some reactance to the track loop, and hence require the track loop to be tuned to account for this. Removing a parallel tuned pickup requires retuning of the track loop for maximum efficiency.

INDUSTRIAL APPLICABILITY

The invention is industrially applicable to the electric powering of mobile vehicles, to the powering of devices separated from the power source because of some required isolation, and to the control of the power supplied to the separated device.

The invention claimed is:

1. A switchable circuit for receiving power inductively from an alternating current power supply and supplying output power to a load, said switchable circuit includes a receiving circuit which is substantially resonant at the frequency of the received power, wherein the receiving circuit is a series resonant circuit, the output of the receiving circuit is rectified in a rectifier, the rectified output is supplied to a boost connected switched mode power circuit which supplies output power, and a switch of the power circuit is controlled to maintain the output power voltage constant as the load varies and on the load where the rectifier current substantially reduces to zero, the switchable circuit for receiving power will substantially decouple itself from said alternating current power supply.

2. A switchable circuit for receiving power as claimed in claim 1 wherein the switchable circuit utilises a full wave rectifier as the rectifier and a unidirectional switching component as the switch in the switchable circuit.

3. A switchable circuit for receiving power as claimed in claim 1 wherein the switch is disposed to short circuit the rectified output.

4. A switchable circuit for receiving power as claimed in claim 1 wherein the switch is continually switched at a frequency higher than the power supply frequency and asynchronous with the power supply frequency with a variable on/off time to regulate the output voltage or current.

5. A switchable circuit for receiving power as claimed in claim 1 wherein the switch is continually switched at a frequency lower than the power supply frequency with a variable on/off time to regulate the output voltage and current.

6. A switchable circuit for receiving power as claimed in claim 1 wherein the failure mode due to the failure of a single component is identifiable and the circuit will not self destruct in the event of such a failure.

* * * * *